United States Patent
Sano et al.

(10) Patent No.: US 12,074,928 B2
(45) Date of Patent: Aug. 27, 2024

(54) AUTOMATED MEDIA EVENT DETECTION AND CORRECTIVE ACTIONS FOR COMMUNICATION SESSIONS

(71) Applicant: Microsoft Technology Licensing, LLC, Redmond, WA (US)

(72) Inventors: Christopher M. Sano, Redmond, WA (US); Brett D. Humphrey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/085,131

(22) Filed: Dec. 20, 2022

(65) Prior Publication Data
US 2024/0205277 A1    Jun. 20, 2024

(51) Int. Cl.
*H04L 65/403* (2022.01)
*G06F 3/16* (2006.01)
*H04L 65/1089* (2022.01)

(52) U.S. Cl.
CPC ............ *H04L 65/403* (2013.01); *G06F 3/167* (2013.01); *H04L 65/1089* (2013.01)

(58) Field of Classification Search
None
See application file for complete search history.

(56) References Cited

U.S. PATENT DOCUMENTS

| | | | |
|---|---|---|---|
| 7,153,139 B2 | 12/2006 | Wen et al. | |
| 7,219,059 B2 | 5/2007 | Gupta et al. | |
| 8,976,218 B2 | 3/2015 | Thorson et al. | |
| 9,854,324 B1* | 12/2017 | Panchaksharaiah | H04N 21/8106 |
| 10,764,534 B1* | 9/2020 | Shevchenko | G06F 40/232 |
| 10,860,805 B1* | 12/2020 | Coppersmith | G06Q 10/0639 |
| 11,017,778 B1 | 5/2021 | Thomson et al. | |
| 11,617,008 B1* | 3/2023 | Gupta | G06N 3/048 725/9 |
| 2010/0027765 A1 | 2/2010 | Schultz et al. | |
| 2011/0313850 A1* | 12/2011 | Hahn | G06Q 30/0246 705/14.45 |
| 2019/0384811 A1* | 12/2019 | Sen | G06F 40/253 |

(Continued)

OTHER PUBLICATIONS

"Zoom Profile", Retrieved From: https://support.zoom.us/hc/en-us/articles/4402698027533-Adding-and-sharing-your-pronouns, Jan. 5, 2022, 3 Pages.

(Continued)

*Primary Examiner* — Scott B Christensen
(74) *Attorney, Agent, or Firm* — Schwegman Lundberg & Woessner, P.A.

(57) ABSTRACT

Disclosed in some examples, are methods, systems, and machine-readable mediums which provide for an automated communication session assistant that assists participants in planning and conducting communication sessions that respect one or more media customization settings of other participants. Users of the network-based communication service may register, and store in a user profile, one or more media customization settings. These media customization settings may correlate to one or more rules in a rule data store. Each rule may specify one or more media events that may impact one or more media customization settings of participants. The rules may also describe curative actions, such as prompts to participants and the like.

20 Claims, 5 Drawing Sheets

(56) References Cited

U.S. PATENT DOCUMENTS

| | | | |
|---|---|---|---|
| 2020/0092339 A1 | 3/2020 | Rakshit et al. | |
| 2021/0248316 A1* | 8/2021 | Wroczynski | G06F 40/216 |
| 2021/0271864 A1 | 9/2021 | Litvin | |
| 2021/0327416 A1 | 10/2021 | Clark et al. | |
| 2022/0191115 A1* | 6/2022 | C S | H04L 43/103 |
| 2022/0329556 A1* | 10/2022 | Daga | H04L 51/23 |
| 2023/0125367 A1* | 4/2023 | Yang | G06F 40/20 |
| | | | 715/233 |

OTHER PUBLICATIONS

Gamecho, et al., "Automatic generation of tailored accessible user interfaces for ubiquitous services", IEEE, vol. 45, Issue. 5, 2015, pp. 612-623.

International Search Report and Written Opinion received for PCT Application No. PCT/US23/035936, Feb. 8, 2024, 15 pages.

* cited by examiner

AUTOMATED MEDIA EVENT DETECTION AND CORRECTIVE ACTIONS FOR COMMUNICATION SESSIONS

TECHNICAL FIELD

Embodiments pertain to automated communication session assistants which in some examples detect media related events in media shared during a network-based communication session such as a network-based meeting. Some embodiments relate to providing corrective actions in response to the detection of those events. Some embodiments relate to providing pre and post network-based communication session reports.

BACKGROUND

Modern communication tools allow users to participate in network-based communication sessions. These communication sessions allow for voice, video, application sharing, and content sharing amongst a plurality of participants, some of whom may be remote from each other. These communication sessions allow users to experience a collaboration session that is close to, and in some respects better than, an in-person meeting.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

While communication sessions provided by network-based communication services offer powerful collaboration tools, the remoteness of these sessions may cause problems for certain participants. Certain events during the media session may not be presented in a form that is conducive to a particular individual's ability to participate in the communication session. Some examples include a participant referring to visual content that is shared by stating "as you can see . . . "; presenting a visual element during the meeting without an audio explanation; sharing a video that does not have proper close captioning for participants that have hearing disabilities; and the like. In these examples, these occurrences may be fine for communication sessions where all participants can indeed see and hear what is being discussed, but there may be communication sessions in which a participant cannot see or hear what is being discussed. That is, while a participant may state "as you can see," there may be instances where a participant cannot in fact "see" what is being emphasized. Other events that may affect a participants experience in a network-based communication session may include mispronouncing a participant's name, using an incorrect pronoun to refer to a participant and the like. Most often these events are not the result of an intentional slight, but rather flow from the difficulty inherent in both managing or participating in a meeting and also remembering the particular needs of each participant.

Disclosed in some examples, are methods, systems, and machine-readable mediums which provide for an automated communication session assistant that assists participants in planning and conducting communication sessions that respect one or more media customization settings of other participants. Users of the network-based communication service may register, and store in a user profile, one or more media customization settings. For example, the media customization settings may indicate a disability, inclusion, or other media customization setting. These media customization settings may correlate to one or more rules in a rule data store. Each rule may specify one or more media events that may impact one or more media customization settings of participants. For example, a media customization setting may indicate that a user is hearing impaired and a rule corresponding to that customization setting may be that video shared during the communication session should include subtitles. A media event in such examples may comprise an instance in which video lacking subtitles is shared in a communication session. The rules may also describe curative actions, such as prompts to participants and the like.

As used herein, a media event comprises any specified condition occurring within any media associated with the network-based communication session. Media events may include words or phrases spoken during the meeting, a lack of audio description for a video presentation, a lack of visual content for audio, a shared document, application, or presentation with accessibility or formatting issues, lack of closed captions, and the like. Conditions may include, for example, specific words or phrases spoken during a communication session, types of content shared, the content of content shared, a lack of description for shared content, and the like. Example words or phrases may include a description of a participant that is not correct (e.g., a mispronunciation of their name, use of a wrong pronoun, or the like), an audio prompt to view a visual element, a visual element that does not have an associated audio explanation, an audio element that does not have a visual description (such as closed captions), and the like. Media may include streamed audio (e.g., conversations), video, chats, content shared, documents, and the like.

As previously described, the communication session assistant may perform pre-session assistance to provide automated guidance to the organizer in preparation for the communication session. For example, the organizer may be reminded of specific accommodations for one or more participants. A report may be provided to the organizer of the communication session identifying any issues found and reporting one or more media customization settings of participants. For example, the report may remind the organizer that a participant has a hearing disability. In other examples, the communication session assistant may scan documents to be shared (if included in the invite or later added to an agenda or calendar appointment), agenda items, and the like to, among other things to identify incompatibilities between these items and the media customization settings of each of the participants. For example, documents may be scanned for issues that may impact a specific customization setting of a participant. Particular issues of a document that may impact particular media customization settings of participants may be specified within the rulesets. Example issues may include one or more of: a lack of alternative text for non-text content; content that is in a small font size or is hard to see; content that is in a color that does not contrast with the background; a lack of closed captions for audio or video; a lack of textual description for visual items; and the like. In some examples, documents with identified issues may be automatically fixed. In other examples, the document may be sent (either automatically, or with permission of the organizer) to an individual in an organization of the participant who knows how to fix these issues. In some examples, videos that are to be shared may be scanned to determine whether they are close-captioned and in some examples, may be sent to designated individuals in an organization that check to ensure the close-captions are correct.

In some examples, issues that do not affect any participants may not be corrected or disclosed to the organizer. For example, if none of the participants has a customization setting mapping to a media event requiring close captioning of videos, a video without close captioning that is to be shared during the communication session may not trigger a warning or any automated actions. In other examples, a base set of rules may map to media events that are applied to all communication sessions regardless of the individual media customization settings of participants. If the close captioning media event is one of the media events that maps to the base set of rules, then plans to share a video without close captioning may trigger a warning and/or automated actions to cure the situation even if a participant does not have a customization setting mapping to the media event.

The communication session assistant may also monitor media during the communication session for media events. At the beginning of the meeting, the communication session assistant may identify the media customization settings of participants as well as any base settings, identify the rulesets corresponding to those media customization settings and base settings; and begin scanning for media events specified in the rulesets. Upon detecting a media event, the associated curing action specified in the ruleset may be executed. Media events may be scanned by translating voice audio to language constructs and matching the language constructs to conditions (such as phrases like "as you can see"). In other examples, detecting an attempt at pronouncing a name of a participant and comparing that pronunciation to an established pronunciation, and the like. In yet other examples, the system may scan shared media to determine the presence of subtitles, media events in documents, and the like.

In some examples, the event scanning may employ deeper analytics. For example, a visual element may be displayed such as a video, application share, or the like. The event scanning may determine that a user has difficulty seeing and may scan the audio to ensure that an audio description of the visual content is provided. For example, the audio may be converted to a transcript. The visual element may also be scanned using object recognition algorithms such as region-based convolutional neural networks or other applicable methods. Keyword searching of the transcript may be employed to determine whether the objects identified in the visual element are discussed in the audio. Keywords may be a name of an object identified or a prespecified list of synonyms. In some examples, multiple objects may be shown and discussed and a curative action may be employed if a specified threshold or percentage of the objects shown are not discussed. The threshold may be specified in the media customization settings, the rulesets, or may be specified by an administrator.

In some examples, the data structure identifying the media events corresponding to the media customization settings may have a severity level for each media event. For example, the communication session assistant may not execute the curing action depending on a rate of other curing actions performed that are directed to a particular participant. That is, to avoid overloading a particular participant with curing actions, the system may throttle the rate at which curing actions are executed towards the participant. In some examples, the throttling algorithm may take into consideration a severity level. Thus, a curing action may not be executed for a media event with a low severity rating if the frequency of curing actions previously delivered towards a participant is high. In contrast, a curing action may be executed for a media event with a high severity rating even with a high frequency of curing actions previously delivered. This ensures that media events with a high impact on the ability of a participant to effectively participate in the communication session will likely have a curative action taken, while less impactful events may or may not have a curative action taken. This strikes a balance between not distracting participants, but at the same time ensuring that the most impactful events are acted upon.

Curing actions may include prompts to one or more participants and/or the meeting organizer. For example, prompts to the participant that initiated the media with the event—such as the participant that uttered the word or phrase. Prompts may include the particular trigger event, and one or more methods for fixing the issue. For example, if the trigger event was the participant stating "as you can see," and there happens to be a person with a sight impairment, the participant that utter the phrase may be prompted that there may be participants that cannot see and recommending that they describe what is being shown.

In other examples, automated curative actions may be applied including automatic transcription (e.g., to automatically produce subtitles for a visual element), automatic color corrections (e.g., for participants that are colorblind), and other automatic fixes to documents or shared content, and the like. The curative actions may store rules for automatically fixing the issue—such as rules for fixing documents of one or more different formats. In some examples, where the curative action is changing a shared document (e.g., changing the colors in the document for a colorblind participant), the cured document may be presented to all participants, or in some examples, only to the participant with the media customization setting that indicates that they are colorblind. Other example automated curing actions include launching a screen reader service to interpret and describe visual contents shared on the screen if a user has a visual disability.

In some examples, after the communication session, the communication session assistant may provide an after-session report to one or more participants. The report may be specific to a participant and may list the media events that were detected that originated from the particular participant as well as curing actions and advice for future communication sessions. In some examples, the report may include one or more metrics. Examples include a number of media events detected that originated from the user, a number of curing actions taken towards the user, and the like.

In some examples, the communication session assistant may provide metrics from all participants of a particular communication session. For example, a number of detected media events for the communication session, total curing actions taken for the communication session, and the like. The metrics may include breakdowns of the media events, the curing actions, which users originated media events, and curing actions and the like. These metrics may be aggregated for various components an organization to provide a health report for those components or for an organization as a whole to understand whether media events are happening regularly and if so, which media events.

In addition to responding to media events and issues throughout the communication session, the communication session assistant may be proactive in that it may provide reminders throughout the meeting about various accommodation needs of participants. These may be provided the same as curing actions except that the language may not be specific to a media event, but may be general reminders.

In some examples, since the list of media events that the communication session assistant scans for depends on the particular participants, the system may employ one or more plug-ins that each look for one or more particular media events. By only loading the particular plug-ins that scan for media events indicated by media customization settings of meeting participants—rather than having a software module that looks for all possible media events—the system may save computing resources such as memory, processing power, and other resources by not loading code that will not be executed (e.g., code scanning for media events that are not relevant to a participant in the network-based communication session).

Without the assistances of the communication session assistant, users with specific needs may need to waste valuable time asking for clarification or explanation. This takes additional time and thus wastes computing resources as it extends the time of the communication session which uses additional network resources, additional power, and additional computation. In addition, the disclosed techniques improve interactions between a computing device and participants. For example, by providing participants with automated and constructive feedback upon the automated detection of events, the system provides a communication-session whereby participants would not have to directly disclose their disability to other participants—which is something that they may not desire to do. This ensures an equitable experience for all. For example, the participant being corrected will have an automated and discrete message shown to them by the system, rather than another participant (and not other participants unless they also trigger an event). The present disclosure thus educates participants. The present disclosure utilizes one or more rulesets based upon media customization settings to detect media events within a communication system and, based upon a curative action in the ruleset, to execute a curative action, such as modify a graphical user interface of a participant to enhance the user experience for all participants. The claimed process uses a combined order of specific rules that renders information into a specific format that is then used and applied to create desired results, an improved communication interface of a network-based communication session. In addition, human judgment on what is and what is not a media event necessitating correction is replaced with neutral rules. The disclosure thus solves the technical problem of inefficient use of computing resources and inefficient user interfaces using the technical solution of detection of media events and providing curative action through pre-defined rulesets.

Figure 1:
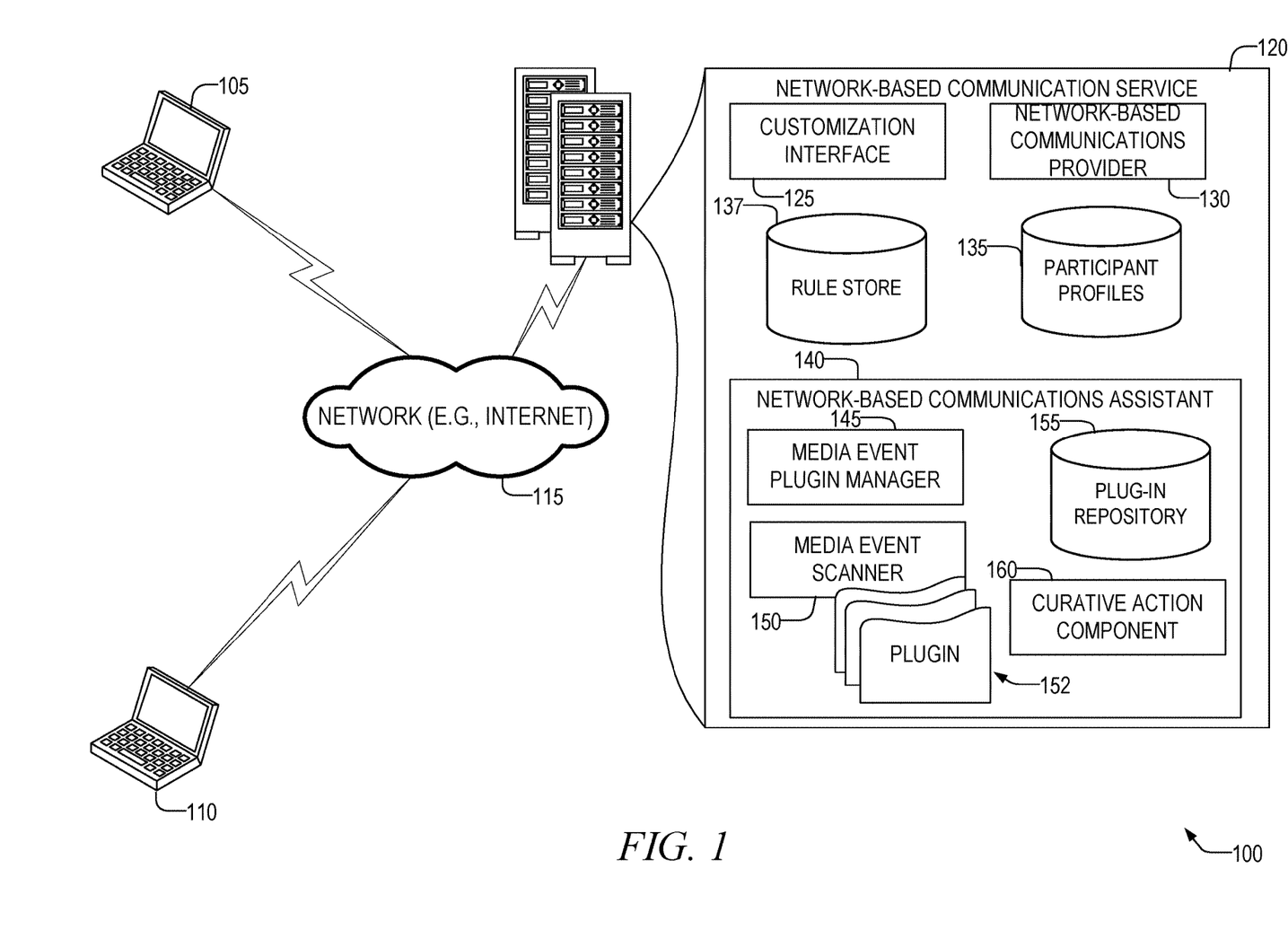
FIG. 1 illustrates a block diagram of a communication system according to some examples of the present disclosure.

FIG. 1 illustrates a block diagram of a communication system 100 according to some examples of the present disclosure. FIG. 1 illustrates a first participant computing device 105 illustrated as a laptop in the upper left-hand portion of the figure. The first participant computing device 105 is shown as being communicatively coupled to a network 115. The communicative coupling is illustrated as a signal in the form of a lightning bolt. The network 115 is symbolically represented by a network cloud and may be a packet-based or circuit switched network. The network 115 may be a Local Area Network (LAN), Wide Area Network (WAN), the Internet, or the like. A second participant computing device 110 is shown similarly in a lower left-hand corner of the figure. The first participant computing device 105 and second participant computing device 110 may execute a network-based communication application (which is not shown for clarity) that communicates using the communicative coupling to the network 115, with a network-based communication service 120.

Network-based communication service 120 is illustrated as a group of computer servers in an upper central portion of the diagram. The network-based communication service 120 is also shown as being communicatively coupled to the network 115. Next to the computer servers, a logical diagram of a network-based communication service 120 executing on the computer servers is shown as a large box with multiple boxes within it that are logical components of the network-based communication service 120. Logical components included within the network-based communication service 120 in the figure include a media customization settings interface component 125, network-based communications provider component 130, a participant profiles component 135 (which is shown as a datastore), rule store component 137 (which is also shown as a data store) and a network-based communications assistant 140. Network-based communications assistant 140 is illustrated as a large box with additional component boxes within it. Additional components of the network-based communications assistant 140 include a media event plugin manager 145, a media event scanner 150, a group of active media scanning plugins 152, a plug-in repository 155, and a curative action component 160. One of ordinary skill in the art with the benefit of the present disclosure will appreciate that the components shown are exemplary and that additional components may be part of the system 100 and that some components shown may be combined with other components, renamed, or omitted.

Network-based communication service 120 provides one or more network-based communication sessions for participants utilizing instances of a network-based communication application executing on computing devices, such as first participant computing device 105 and second participant computing device 110. The network-based communication applications executing on participant computing devices such as participant computing devices 105, 110 provides one or more user interfaces for setting up, joining, and participating in communication sessions with one or more other participants. The network-based communication application communicates voice, video, and other media from their respective computing devices to network-based communications provider component 130 of the network-based communication service 120. Network-based communications provider component 130 of the network-based communication service 120 may receive the media from participant devices, mix the media with other media received from other participant device, and then transmit the media of the communication session to one or more participant devices executing network-based applications. These devices may then output this media.

Network-based communication provider component 130, as well as the network-based communication applications, may implement one or more protocols for setting up communication sessions and receiving and sending media, such as HyperText Transfer Protocol (HTTP), Session Initiation Protocol (SIP), Real Time Transport Protocol (RTP), and the like. Additionally, the network-based communications provider component 130 may implement one or more media coders and decoders to encode and decode media. Network-based communication application may be a dedicated communication application, or a browser-based communication application for joining and participating in communication sessions via a web-browser.

Media customization settings interface component 125 of the network-based communication service 120 may provide one or more graphical user interfaces (GUIs) allowing users to input various settings, such as media customization settings. These settings are saved in a participant's profile by participant profiles component 135. Example media customization settings may include participant media customization settings such as an identification of one or more disabilities, accommodations, inclusion settings, one or more preferred pronouns, information about a proper pronunciation of a name, or the like. In some examples, rather than identifying specific information about the participant (such as disabilities or accommodations), the media customization settings may include, or link to, specific rules—such as, "please describe all visual content," and the like.

In some examples, these media customization settings may then be mapped to media event rules, such as those stored by the rule store component 137. The rules may include specific media event triggers, such as specific words; specific phrases; types of content shared; content shared without an audio explanation; content shared without subtitles; content shared with certain issues that make the content difficult for some individuals to see or hear; documents or content that have poor contrast or uses colors that may be difficult for a colorblind user to see; and the like. Each rule may include a curative action. For example, a curative action may automatically (either with, or without the sharing participant's approval), update a document to remove rule violations. For example, a document with colors that include confusion colors for a particular participant that may be colorblind may be automatically updated with colors that do not confuse that participant. Confusion colors are pairs or groups of colors that will often be mistaken by the colorblind. For example, for a red-green colorblind person, confusion colors may comprise: cyan and grey; rose-pink and grey; blue and purple; yellow and neon green; and red, green, orange, and brown.

In some examples, rather than fixing the document automatically, a document may be sent, based upon the type of issue, to an individual within the organization that can fix the document. In these examples, the system may launch an automated, or semi-automated workflow that assigns curative actions, tracks fixes, and the like. In other examples, a curative action is a message in a GUI of the communication session—such as a pop-up, or other notification. The curative message may be displayed to everyone or may be displayed only to the participant that triggered the event.

The rules stored in the rule store component 137 may include default rules corresponding to particular customization options of the participant profiles. That is, if the participant indicates a hearing disability the default rules may apply default media events and default curing actions. Participants may, however, customize these default rules to create a new customized ruleset.

In some examples, each rule includes a severity. That is, some media event instances may be less annoying to participants than other media event instances. In these examples, the network-based communications assistant 140 may not execute the curative action for a particular media event with a low severity if a lot of other curative actions have been executed towards the participant that originated the particular media event in the past. This prevents the network-based communications assistant from becoming a distraction to participants. Nevertheless, some events with high severity levels may be acted upon and the associated curing action executed regardless of a previous frequency of curative actions toward the participant. This ensures that events critical for a participant to understand what is happen are delivered.

Network-based communication assistant 140 may include a media event plugin manager 145, a media event scanner 150, a plug-in repository 155, active media scanning plugins 152, and a curative action component 160. Media event scanner 150 may provide event detection and recognition prior to the communication session, during the communication session, and after the communication session.

Prior to a communication session—e.g., after scheduling, or just before the session is scheduled to begin, or some time in-between—the media event scanner 150 may determine the participants of the session. The media event scanner 150 may then identify the media customization settings of the participants from the participant profiles using the participant profile component 135. Based upon the media customization settings of the participants, the media event scanner 150 may determine a set of rules and corrective actions from the rule store component 137. Based upon the rules, the information about the meeting—such as the list of invited participants, the media included in the invitation or on the agenda, and the like—may be analyzed to determine any issues prior to the communication session. Example issues found and/or fixed may comprise: fixing issues with documents; providing reminders to the organizer about a disability of a participant; automatically inviting an aide (e.g., a translator, a sign language assistant, a sighted assistant, or the like) associated with the participant, and the like. These issues may be automatically fixed with or without the organizer's input.

During the communication session, the media event scanner 150 scans media events using the rules from the rule store component 137. The rules used by the media event scanner 150 may be a subset of all rules in the rule store chosen based upon the media customization settings in the participant profiles of participants in the communication session. As previously described, these may be default rules given the media customization settings of the participant or may be customized rules. Scanning during the communication session may comprise speech recognition and transcription to compare to known words and phrases; comparison of word pronunciation; natural language processing and understanding to determine if visual media that is presented is discussed; and the like. These techniques may include machine-learned models such as hidden Markov models, dynamic time warping (DTW) based speech recognition, neural networks, deep feedforward and recurrent neural networks, end-to-end automatic speech recognition, and the like.

Example techniques for determining whether a visual element is described may include applying both speech recognition to produce an automated transcript and image recognition to determine one or more subjects of visual content shared by a participant. The transcript is then searched to determine if the subject or a synonym is mentioned and a frequency with which it is mentioned. If the subject or a synonym is not mentioned at all, or not mentioned with a specified frequency (the frequency may be specified in the ruleset), a curative action may be triggered.

Curative action component 160 may execute the curative action. In some examples, this may include launching a thread or process to convert a document from a first form to a second form, translate a document, change colors of a document, or the like. This may include sending a prompt to one or more participants, or the like. Curative action component 160 may launch one or more workflows, such as workflows that update one or more issues in one or more documents. Curative action component 160 may track a frequency with which curative actions are applied to each of the participants. In some examples, curative action component 160 may not perform the associated curative action depending on the frequency of past curative actions applied to a participant and the severity of the media event.

Media event plugin manager 145 may, in some examples, manage one or more plugins. In some examples, the media event scanner 150 may utilize plugins, such as active media scanning plugins 152 to scan for issues. The media event plugin manager 145 may load active media scanning plugins 152 from plug-in repository 155 based upon the rules that the media event scanner 150 scans for given the rules associated with the participants and their media customization settings. Each plugin may scan for one or more different media events. Thus, the media event plugin manager 145 scans the list of participants, determines the media customization settings of those participants, determines the associated rulesets, and based upon those rulesets, selects one or more plug-ins from the plug-in repository 155 that includes executable instructions that will, based upon an input media, scan for the media event described in each rule. By using plugins, in some examples, it makes the media event scanner 150 more adaptable to scanning for future media events that may later arise and may also keep the execution size of the media event scanner 150 lower and thus saves computing resources.

After the communication session, the media event scanner 150 may provide one or more reports to one or more participants documenting the types of media events detected from media originating from that participant's computing device, what corrective actions were taken, and the like. The media event scanner 150 may provide a comprehensive report of all media events occurring to an organizer of the communication session.

Figure 2:
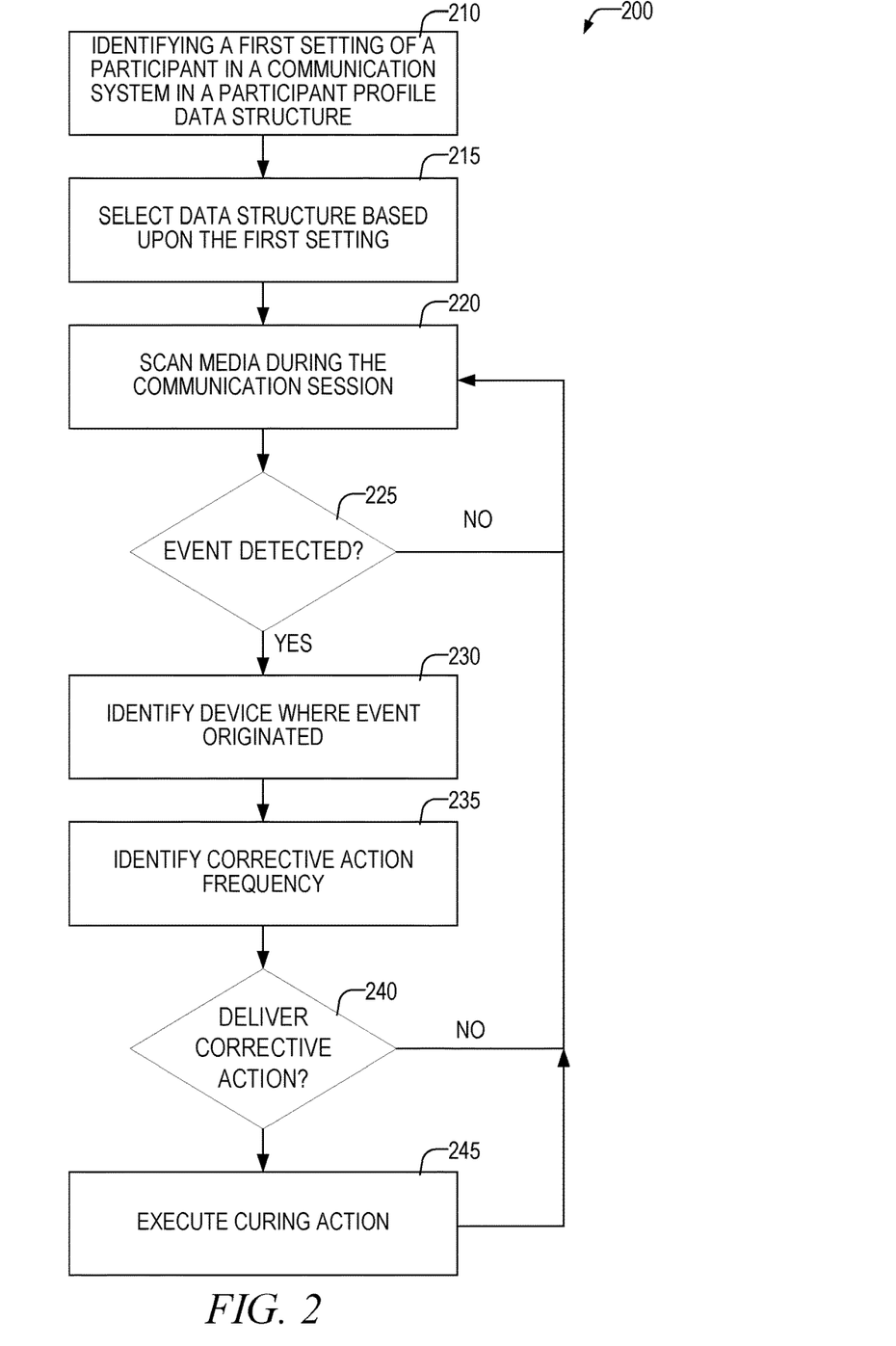
FIG. 2 illustrates a flowchart of a method of taking corrective action in response to an event in a communication session of a communication system according to some examples of the present disclosure.

FIG. 2 illustrates a flowchart of a method 200 of taking corrective action in response to an event in a communication session of a communication system according to some examples of the present disclosure. The flowchart of the method 200 is organized into a series of boxes with an operation in each box described in text and connected with arrows that show the flow of the method. The figure does not show, but optionally may include, and as already described, providing a pre-session report that provides information on the media customization settings of participants, fixes issues in documents or other media that is to be shared or discussed, and the like. In addition, the flow does not show, but optionally may include providing a post-session report.

At operation 210, as shown in the first box at the top, the system identifies a first media customization setting of a participant in a communication system in a participant profile data structure corresponding to the participant, the participant using a first device in the communication session. Example first settings include media customization settings as described herein. The system may identify participants of a communication session, load their participant profiles, and determine a set of media customization settings applicable to all participants. In some examples a set of default settings are also determined.

Flow then proceeds to the next box, which is operation 215, where the system selects a data structure based upon the first setting, the data structure comprising a description of a first media event, an associated first curing action to take in response to detection of the media event, and in some examples, a severity level. For example, based upon the settings information obtained in operation 210, the system may identify one or more rules from the rule store that apply to that setting. In some examples, the media event comprises one or more of: an audio prompt to view a visual element, a visual element that does not have an associated audio explanation, an audio element that does not have an associated visual description, or a particular description of a participant.

Flow then proceeds to operation 220 shown in the next box, where the system scans media of the communication session during the communication session for the event, the media being audio, video, or shared content of the communication session. As noted previously, the system may utilize one or more algorithms, machine-learning models, and the like.

At operation 225, a diamond box represents a decision as to whether an event was detected. The box has two branches, a first branch where no event was detected leads the method flow back to the box containing operation 220 just above the diamond box of operation 225 where media is scanned. If an event is detected, then flow proceeds to the next box down at operation 230, wherein the system identifies, based upon the analysis of media of the communication session, a second device where the media indicating the event originated, the device one of a plurality of devices participating in the communication session, the first and second devices different.

Flow proceeds from operation 230 to operation 235 at the next box down where the system determines a frequency for which curing actions have been taken during the communication session that are directed to the second device. For example, the frequency may be a number of curative actions over a prespecified period of time. Flow then proceeds from operation 235 to a decision box at operation 240 where it is decided whether to execute the curing action based upon the frequency and the severity level of the first setting.

If the decision is not to deliver a corrective action, then flow proceeds back to operation 220 where the media session is scanned. If a corrective action is to be taken, then flow proceeds to the next box down, where at operation 245, responsive to determining to execute the curing action, the system executes the curing action targeted at the second device. In some examples, the curing action is targeted at the second device, but not targeted to the other of the plurality of devices participating in the communication session. In some examples, a form of the curing action may depend on media customization settings of the target of the curing action in the participant profile. For example, if the user is sight impaired, the notification may be delivered as electronically created speech. After executing the curing action at operation 245, flow may proceed back to operation 220 where the media is scanned for additional events until the communication session is over.

Figure 3:
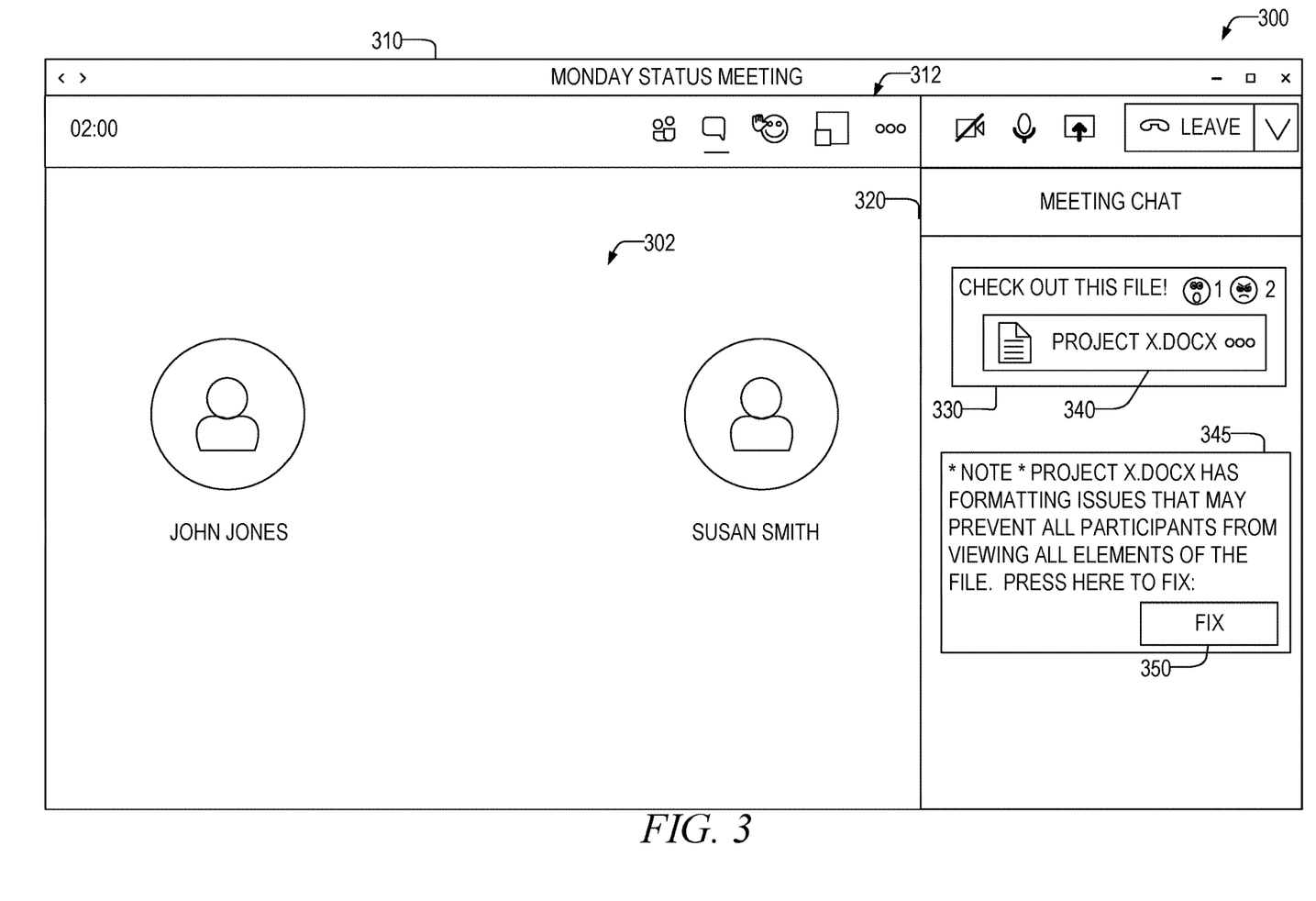
FIG. 3 illustrates a user interface of a communication session according to some examples of the present disclosure.

FIG. 3 illustrates a user interface 300 of a communication session according to some examples of the present disclosure. The user interface includes a first window 310 with a title of the communication session, which in this case is "Monday Status Meeting." The user interface includes a row of icons 312 across the top, which when pressed, performs various functionality such as inviting other users, opening a chat window, raising a hand, minimizing a window, disabling or enabling video, muting or unmuting the microphone, sharing content, and leaving the meeting. In the user interface shown, a main stage 302 positioned below the icons shows names of two users who are present and their associated avatars. In the example of FIG. 3, there are two users, "John Jones" and "Susan Smith." On the right-hand side, there is a meeting chat box 320 that shows a chat message 330 that says "Check out this File!" and attaches a file 340 named "Project X.docx" that is represented in the user interface by a file icon that, when clicked, allows users to download and/or open the file.

In the example of FIG. 3, the network-based communications assistant has identified a media event as a result of the chat message. This media event includes identification of a file with formatting, or other issues. The network-based communications assistant therefore provides a curing action, in this case a prompt—shown as a box 345 below the message that states "Note * Project X.docx has formatting issues that may prevent all participants from viewing all elements of the file. Press here to fix." The box 345 has a user interface control in the form of a button 350 that allows the user to agree to fix the file. In some examples, the fix may be automatically done without the user having to click the fix button. In some examples, once the file is fixed, the copy originally posted is replaced with the fixed copy.

Figure 4:
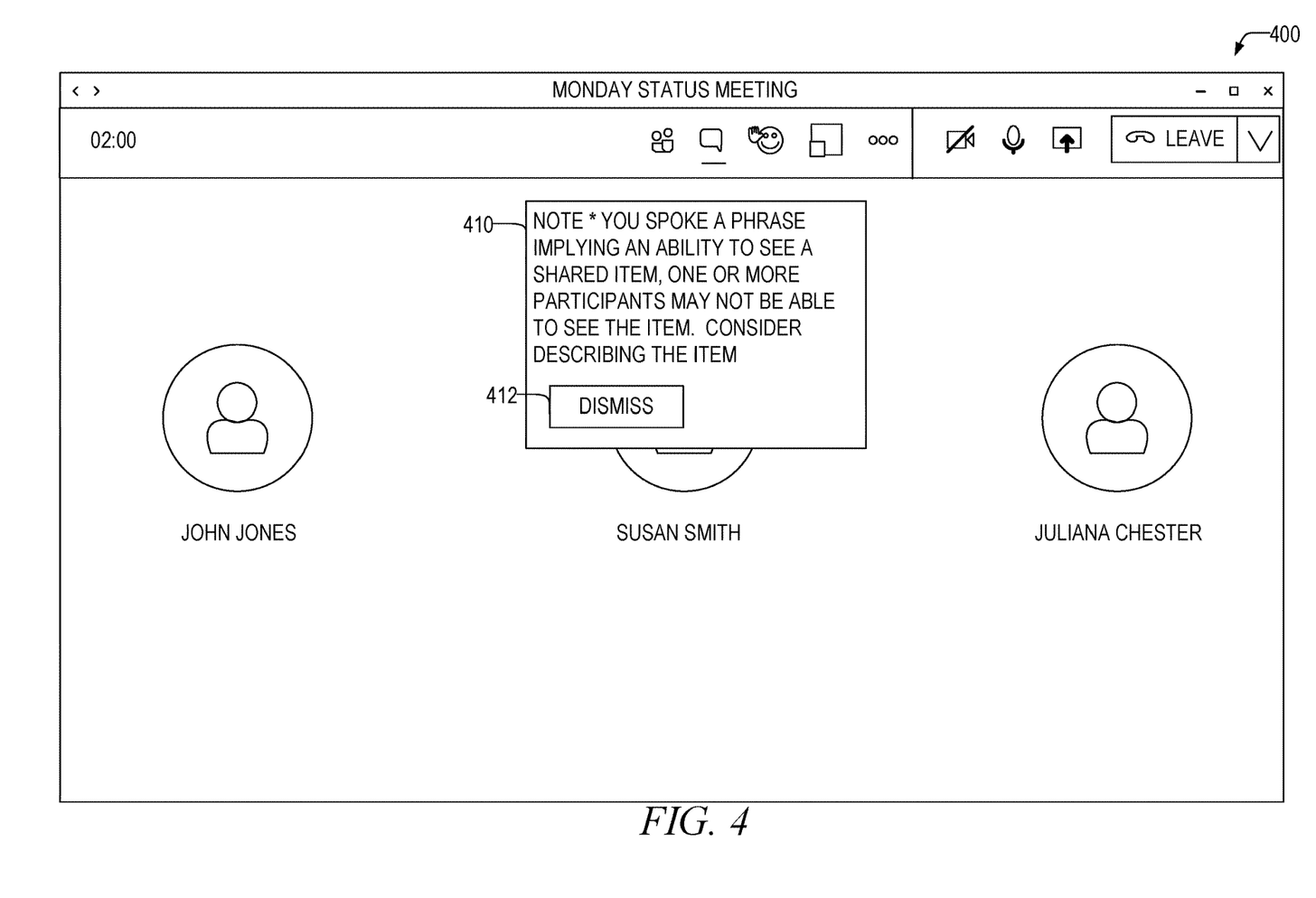
FIG. 4 illustrates a user interface of a communication session according to some examples of the present disclosure.

FIG. 4 illustrates a user interface 400 of a communication session according to some examples of the present disclosure. The user interface 400 is very similar to that shown in FIG. 3 with the exception that the chat window has been closed revealing a third participant's name and their avatar. In this example, the network-based communication assistant has identified a media event within audio spoken by a participant. The network-based communication assistant has taken a curing action and prompted the participant using a prompt 410, which reads "Note * you spoke a phrase implying an ability to see a shared item, one or more participants may not be able to see the item. Consider describing the item." A button 412 at the bottom of the prompt allows the user to dismiss the prompt.

Figure 5:
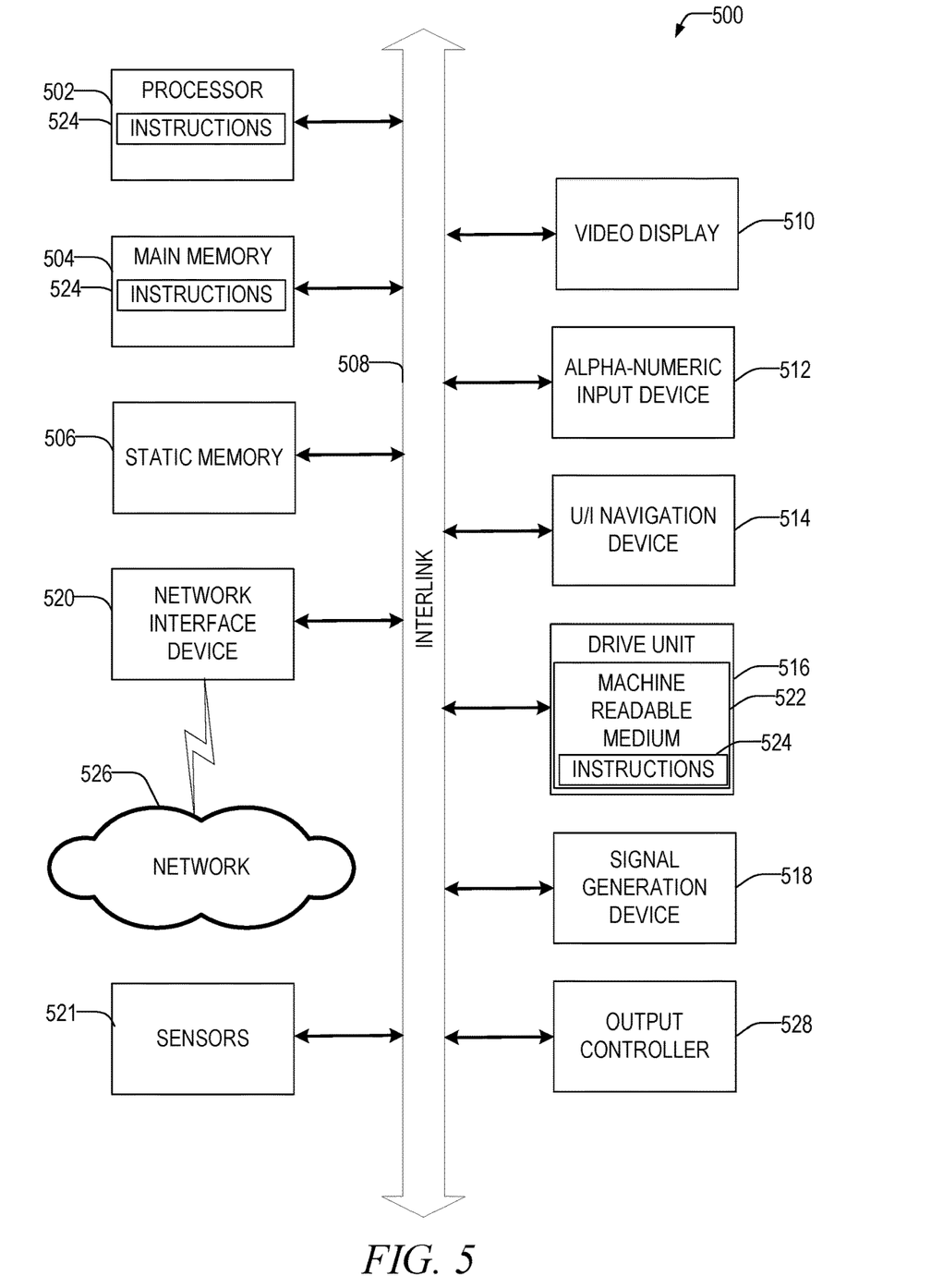
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be in the form of a server computer, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 500 may be configured to implement any of the devices and components of FIG. 1, the method of FIG. 2, and the user interfaces of FIGS. 3 and 4.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 500 may include one or more hardware processors, such as processor 502. Processor 502 may be a central processing unit (CPU), a graphics processing unit (GPU), a hardware processor core, or any combination thereof. Machine 500 may include a main memory 504 and a static memory 506, some or all of which may communicate with each other via an interlink (e.g., bus) 508. Examples of main memory 504 may include Synchronous Dynamic Random-Access Memory (SDRAM), such as Double Data Rate memory, such as DDR4 or DDR5. Interlink 508 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Other Notes and Examples

Example 1 is a method of taking corrective action in response to an event in a communication session of a communication system, the method comprising: using a hardware processor: identifying a first setting of a participant in the communication system in a participant profile data structure corresponding to the participant, the participant using a first device in the communication session; selecting a data structure based upon the first setting, the data structure comprising a description of a first media event, an associated first curing action to take in response to detection of the first media event, and a severity level, the first media event comprising one or more of: an audio prompt to view a visual element, a visual element that does not have an associated audio explanation, an audio element that does not have an associated visual description, or a particular description of a participant; scanning media of the communication session during the communication session for the first media event, the media of the communication session being audio, video, or shared content of the communication session; identifying the first media event in the media of the communication session; and responsive to identifying the first media event: identifying, based upon an analysis of media of the communication session, a second device where the media indicating the event originated, the second device one of a plurality of devices participating in the communication session, the first and second devices different; identifying a frequency for which curing actions have been taken during the communication session that are directed to the second device; determining whether to execute the first curing action based upon the frequency and the severity level of the first setting; and responsive to determining to execute the first curing action, executing the first curing action targeted at the second device, but not executing the first curing action respective to other of the plurality of devices participating in the communication session.

In Example 2, the subject matter of Example 1 includes, after the communication session, presenting a prompt on the second device indicating a plurality of events triggered as a result of media originating from the second device, the plurality of events including at least one event where a second curing action was not executed due to the frequency for which curing actions have been taken during the communication session.

In Example 3, the subject matter of Examples 1-2 includes, providing, prior to the communication session, a report identifying settings of a plurality of participants in the communication session.

In Example 4, the subject matter of Example 3 includes, prior to the communication session, scanning a document included in an invitation to the communication session for a compatibility issue between media in the document and the settings of the plurality of participants in the communication session.

In Example 5, the subject matter of Examples 1-4 includes, identifying a second setting of a second participant in the communication system in a second participant profile data structure corresponding to the second participant, the second participant using a third device in the communication session; selecting a second data structure based upon the second setting, the second data structure comprising a description of a second media event, and an associated second curing action to take in response to detection of the second media event, the second media event comprising an audio element without subtitles; wherein scanning the media of the communication session during the communication session comprises scanning for both the first media event and the second media event; identifying the second media event in the media of the communication session; and responsive to identifying the second media event; executing the second associated curing action by automatically creating subtitles.

In Example 6, the subject matter of Examples 1-5 includes, providing a reminder to a participant of the communication session during the communication session of the first setting.

In Example 7, the subject matter of Examples 1-6 includes, calculating a number of media events detected during a plurality of communication sessions of an organization over a specified period of time; and providing a report to a computing device describing the number of media events detected during the plurality of communication sessions of the organization.

Example 8 is a computing device for taking corrective action in response to an event in a communication session of a communication system, the computing device comprising: a hardware processor; a memory, the memory storing instructions, which when executed by the hardware processor causes the device to perform operations comprising: identifying a first setting of a participant in the communication system in a participant profile data structure corresponding to the participant, the participant using a first device in the communication session; selecting a data structure based upon the first setting, the data structure comprising a description of a first media event, an associated first curing action to take in response to detection of the first media event, and a severity level, the first media event comprising one or more of: an audio prompt to view a visual element, a visual element that does not have an associated audio explanation, an audio element that does not have an associated visual description, or a particular description of a participant; scanning media of the communication session during the communication session for the first media event, the media of the communication session being audio, video, or shared content of the communication session; identifying the first media event in the media of the communication session; and responsive to identifying the first media event: identifying, based upon an analysis of media of the communication session, a second device where the media indicating the event originated, the second device one of a plurality of devices participating in the communication session, the first and second devices different; identifying a frequency for which curing actions have been taken during the communication session that are directed to the second device; determining whether to execute the first curing action based upon the frequency and the severity level of the first setting; and responsive to determining to execute the first curing action, executing the first curing action targeted at the second device, but not executing the first curing action respective to other of the plurality of devices participating in the communication session.

In Example 9, the subject matter of Example 8 includes, wherein the operations further comprise: after the communication session, presenting a prompt on the second device indicating a plurality of events triggered as a result of media originating from the second device, the plurality of events including at least one event where a second curing action was not executed due to the frequency for which curing actions have been taken during the communication session.

In Example 10, the subject matter of Examples 8-9 includes, wherein the operations further comprise: providing, prior to the communication session, a report identifying settings of a plurality of participants in the communication session.

In Example 11, the subject matter of Example 10 includes, wherein the operations further comprise: prior to the communication session, scanning a document included in an invitation to the communication session for a compatibility issue between media in the document and the settings of the plurality of participants in the communication session.

In Example 12, the subject matter of Examples 8-11 includes, wherein the operations further comprise: identifying a second setting of a second participant in the communication system in a second participant profile data structure corresponding to the second participant, the second participant using a third device in the communication session; selecting a second data structure based upon the second setting, the second data structure comprising a description of a second media event, and an associated second curing action to take in response to detection of the second media event, the second media event comprising an audio element without subtitles; wherein scanning the media of the communication session during the communication session comprises scanning for both the first media event and the second media event; identifying the second media event in the media of the communication session; and responsive to identifying the second media event: executing the second associated curing action by automatically creating subtitles.

In Example 13, the subject matter of Examples 8-12 includes, wherein the operations further comprise: providing a reminder to a participant of the communication session during the communication session of the first setting.

In Example 14, the subject matter of Examples 8-13 includes, wherein the operations further comprise: calculating a number of media events detected during a plurality of communication sessions of an organization over a specified period of time; and providing a report to a computing device describing the number of media events detected during the plurality of communication sessions of the organization.

Example 15 is a machine-readable medium, storing instructions for taking corrective action in response to an event in a communication session of a communication system, the instructions, which when executed by a computing device, cause the computing device to perform operations comprising: identifying a first setting of a participant in the communication system in a participant profile data structure corresponding to the participant, the participant using a first device in the communication session; selecting a data structure based upon the first setting, the data structure comprising a description of a first media event, an associated first curing action to take in response to detection of the first media event, and a severity level, the first media event comprising one or more of: an audio prompt to view a visual element, a visual element that does not have an associated audio explanation, an audio element that does not have an associated visual description, or a particular description of a participant; scanning media of the communication session during the communication session for the first media event, the media of the communication session being audio, video, or shared content of the communication session; identifying the first media event in the media of the communication session; and responsive to identifying the first media event: identifying, based upon an analysis of media of the communication session, a second device where the media indicating the event originated, the second device one of a plurality of devices participating in the communication session, the first and second devices different; identifying a frequency for which curing actions have been taken during the communication session that are directed to the second device; determining whether to execute the first curing action based upon the frequency and the severity level of the first setting; and responsive to determining to execute the first curing action, executing the first curing action targeted at the second device, but not executing the first curing action respective to other of the plurality of devices participating in the communication session.

In Example 16, the subject matter of Example 15 includes, wherein the operations further comprise: after the communication session, presenting a prompt on the second device indicating a plurality of events triggered as a result of media originating from the second device, the plurality of events including at least one event where a second curing action was not executed due to the frequency for which curing actions have been taken during the communication session.

In Example 17, the subject matter of Examples 15-16 includes, wherein the operations further comprise: providing, prior to the communication session, a report identifying settings of a plurality of participants in the communication session.

In Example 18, the subject matter of Example 17 includes, wherein the operations further comprise: prior to the communication session, scanning a document included in an invitation to the communication session for a compatibility issue between media in the document and the settings of the plurality of participants in the communication session.

In Example 19, the subject matter of Examples 15-18 includes, wherein the operations further comprise: identifying a second setting of a second participant in the communication system in a second participant profile data structure corresponding to the second participant, the second participant using a third device in the communication session; selecting a second data structure based upon the second setting, the second data structure comprising a description of a second media event, and an associated second curing action to take in response to detection of the second media event, the second media event comprising an audio element without subtitles; wherein scanning the media of the communication session during the communication session comprises scanning for both the first media event and the second media event; identifying the second media event in the media of the communication session; and responsive to identifying the second media event: executing the second associated curing action by automatically creating subtitles.

In Example 20, the subject matter of Examples 15-19 includes, wherein the operations further comprise: providing a reminder to a participant of the communication session during the communication session of the first setting.

In Example 21, the subject matter of Examples 15-20 includes, wherein the operations further comprise: calculating a number of media events detected during a plurality of communication sessions of an organization over a specified period of time; and providing a report to a computing device describing the number of media events detected during the plurality of communication sessions of the organization.

Example 22 is a device for taking corrective action in response to an event in a communication session of a communication system, the device comprising: means for identifying a first setting of a participant in the communication system in a participant profile data structure corresponding to the participant, the participant using a first device in the communication session; means for selecting a data structure based upon the first setting, the data structure comprising a description of a first media event, an associated first curing action to take in response to detection of the first media event, and a severity level, the first media event comprising one or more of: an audio prompt to view a visual element, a visual element that does not have an associated audio explanation, an audio element that does not have an associated visual description, or a particular description of a participant; means for scanning media of the communication session during the communication session for the first media event, the media of the communication session being audio, video, or shared content of the communication session; means for identifying the first media event in the media of the communication session; and responsive to identifying the first media event: means for identifying, based upon an analysis of media of the communication session, a second device where the media indicating the event originated, the second device one of a plurality of devices participating in the communication session, the first and second devices different; means for identifying a frequency for which curing actions have been taken during the communication session that are directed to the second device; means for determining whether to execute the first curing action based upon the frequency and the severity level of the first setting; and responsive to determining to execute the first curing action, means for executing the first curing action targeted at the second device, but not executing the first curing action respective to other of the plurality of devices participating in the communication session.

In Example 23, the subject matter of Example 22 includes, after the communication session, means for presenting a prompt on the second device indicating a plurality of events triggered as a result of media originating from the second device, the plurality of events including at least one event where a second curing action was not executed due to the frequency for which curing actions have been taken during the communication session.

In Example 24, the subject matter of Examples 22-23 includes, means for providing, prior to the communication session, a report identifying settings of a plurality of participants in the communication session.

In Example 25, the subject matter of Example 24 includes, prior to the communication session, means for scanning a document included in an invitation to the communication session for a compatibility issue between media in the document and the settings of the plurality of participants in the communication session.

In Example 26, the subject matter of Examples 22-25 includes, means for identifying a second setting of a second participant in the communication system in a second participant profile data structure corresponding to the second participant, the second participant using a third device in the communication session; means for selecting a second data structure based upon the second setting, the second data structure comprising a description of a second media event, and an associated second curing action to take in response to detection of the second media event, the second media event comprising an audio element without subtitles; wherein the means for scanning the media of the communication session during the communication session comprises means for scanning for both the first media event and the second media event; means for identifying the second media event in the media of the communication session; and responsive to identifying the second media event: means for executing the second associated curing action by automatically creating subtitles.

In Example 27, the subject matter of Examples 22-26 includes, means for providing a reminder to a participant of the communication session during the communication session of the first setting.

In Example 28, the subject matter of Examples 22-27 includes, means for calculating a number of media events detected during a plurality of communication sessions of an organization over a specified period of time; and means for providing a report to a computing device describing the number of media events detected during the plurality of communication sessions of the organization.

Example 29 is at least one machine-readable medium including instructions that, when executed by processing circuitry, cause the processing circuitry to perform operations to implement of any of Examples 1-28.

Example 30 is an apparatus comprising means to implement of any of Examples 1-28.

Example 31 is a system to implement of any of Examples 1-28.

Example 32 is a method to implement of any of Examples 1-28.

What is claimed is:

1. A method of taking corrective action in response to an event in a communication session of a communication system, the method comprising:
using a hardware processor:
identifying a first setting of a participant in the communication system in a participant profile data structure corresponding to the participant, the participant using a first device in the communication session, the first setting entered by the participant and related to a physical characteristic of the participant;
selecting a data structure based upon the first setting, the data structure comprising a description of a first media event, an associated first curing action to take in response to detection of the first media event, and a severity level, the first media event comprising one or more of:
an audio prompt to view a visual element, a visual element that does not have an associated audio explanation, or an audio element that does not have an associated visual description;
scanning media of the communication session during the communication session for the first media event, the media of the communication session being audio, video, or shared content of the communication session;
identifying the first media event in the media of the communication session; and
responsive to identifying the first media event:
identifying, based upon an analysis of media of the communication session, a second device where the media indicating the event originated, the second device one of a plurality of devices participating in the communication session, the first and second devices different;
identifying a frequency for which curing actions have been taken during the communication session that are directed to the second device;
determining whether to execute the first curing action based upon the frequency and the severity level of the first setting; and
responsive to determining to execute the first curing action, executing the first curing action targeted at the second device, but not executing the first curing action respective to other of the plurality of devices participating in the communication session.

2. The method of claim 1, further comprising: after the communication session, presenting a prompt on the second device indicating a plurality of events triggered as a result of media originating from the second device, the plurality of events including at least one event where a second curing action was not executed due to the frequency for which curing actions have been taken during the communication session.

3. The method of claim 1, further comprising:
providing, prior to the communication session, a report identifying settings of a plurality of participants in the communication session.

4. The method of claim 3, further comprising:
prior to the communication session, scanning a document included in an invitation to the communication session for a compatibility issue between media in the document and the settings of the plurality of participants in the communication session.

5. The method of claim 1, further comprising:
identifying a second setting of a second participant in the communication system in a second participant profile data structure corresponding to the second participant, the second participant using a third device in the communication session;
selecting a second data structure based upon the second setting, the second data structure comprising a description of a second media event, and an associated second curing action to take in response to detection of the second media event, the second media event comprising an audio element without subtitles;
wherein scanning the media of the communication session during the communication session comprises scanning for both the first media event and the second media event;
identifying the second media event in the media of the communication session; and responsive to identifying the second media event:
executing the second associated curing action by automatically creating subtitles.

6. The method of claim 1, further comprising:
providing a reminder to a second participant of the communication session during the communication session of the first setting.

7. The method of claim 1, further comprising:
calculating a number of media events detected during a plurality of communication sessions of an organization over a specified period of time; and
providing a report to a computing device describing the number of media events detected during the plurality of communication sessions of the organization.

8. A computing device for taking corrective action in response to an event in a communication session of a communication system, the computing device comprising:
a hardware processor;
a memory, the memory storing instructions, which when executed by the hardware processor causes the device to perform operations comprising:
identifying a first setting of a participant in the communication system in a participant profile data structure corresponding to the participant, the participant using a first device in the communication session, the first setting entered by the participant and related to a physical characteristic of the participant;
selecting a data structure based upon the first setting, the data structure comprising a description of a first media event, an associated first curing action to take in response to detection of the first media event, and a severity level, the first media event comprising one or more of: an audio prompt to view a visual element, a visual element that does not have an associated audio explanation, or an audio element that does not have an associated visual description;
scanning media of the communication session during the communication session for the first media event, the media of the communication session being audio, video, or shared content of the communication session;
identifying the first media event in the media of the communication session; and
responsive to identifying the first media event:
identifying, based upon an analysis of media of the communication session, a second device where the media indicating the event originated, the second device one of a plurality of devices participating in the communication session, the first and second devices different;
identifying a frequency for which curing actions have been taken during the communication session that are directed to the second device;
determining whether to execute the first curing action based upon the frequency and the severity level of the first setting; and
responsive to determining to execute the first curing action, executing the first curing action targeted at the second device, but not executing the first curing action respective to other of the plurality of devices participating in the communication session.

9. The computing device of claim 8, wherein the operations further comprise: after the communication session, presenting a prompt on the second device indicating a plurality of events triggered as a result of media originating from the second device, the plurality of events including at least one event where a second curing action was not executed due to the frequency for which curing actions have been taken during the communication session.

10. The computing device of claim 8, wherein the operations further comprise:
providing, prior to the communication session, a report identifying settings of a plurality of participants in the communication session.

11. The computing device of claim 10, wherein the operations further comprise:
prior to the communication session, scanning a document included in an invitation to the communication session for a compatibility issue between media in the document and the settings of the plurality of participants in the communication session.

12. The computing device of claim 8, wherein the operations further comprise:
identifying a second setting of a second participant in the communication system in a second participant profile data structure corresponding to the second participant, the second participant using a third device in the communication session;
selecting a second data structure based upon the second setting, the second data structure comprising a description of a second media event, and an associated second curing action to take in response to detection of the second media event, the second media event comprising an audio element without subtitles;
wherein scanning the media of the communication session during the communication session comprises scanning for both the first media event and the second media event;
identifying the second media event in the media of the communication session; and
responsive to identifying the second media event:
executing the second associated curing action by automatically creating subtitles.

13. The computing device of claim 8, wherein the operations further comprise:
providing a reminder to a second participant of the communication session during the communication session of the first setting.

14. The computing device of claim 8, wherein the operations further comprise:
calculating a number of media events detected during a plurality of communication sessions of an organization over a specified period of time; and
providing a report to a computing device describing the number of media events detected during the plurality of communication sessions of the organization.

15. A device for taking corrective action in response to an event in a communication session of a communication system, the device comprising:
means for identifying a first setting of a participant in the communication system in a participant profile data structure corresponding to the participant, the participant using a first device in the communication session, the first setting entered by the participant and related to a physical characteristic of the participant;
means for selecting a data structure based upon the first setting, the data structure comprising a description of a first media event, an associated first curing action to take in response to detection of the first media event, and a severity level, the first media event comprising one or more of:
an audio prompt to view a visual element, a visual element that does not have an associated audio explanation, or an audio element that does not have an associated visual description;

means for scanning media of the communication session during the communication session for the first media event, the media of the communication session being audio, video, or shared content of the communication session;

means for identifying the first media event in the media of the communication session; and responsive to identifying the first media event:

means for identifying, based upon an analysis of media of the communication session, a second device where the media indicating the event originated, the second device one of a plurality of devices participating in the communication session, the first and second devices different;

means for identifying a frequency for which curing actions have been taken during the communication session that are directed to the second device;

means for determining whether to execute the first curing action based upon the frequency and the severity level of the first setting; and responsive to determining to execute the first curing action, means for executing the first curing action targeted at the second device, but not executing the first curing action respective to other of the plurality of devices participating in the communication session.

16. The device of claim 15, further comprising: after the communication session, means for presenting a prompt on the second device indicating a plurality of events triggered as a result of media originating from the second device, the plurality of events including at least one event where a second curing action was not executed due to the frequency for which curing actions have been taken during the communication session.

17. The device of claim 15, further comprising:

means for providing, prior to the communication session, a report identifying settings of a plurality of participants in the communication session.

18. The device of claim 17, further comprising:

prior to the communication session, means for scanning a document included in an invitation to the communication session for a compatibility issue between media in the document and the settings of the plurality of participants in the communication session.

19. The device of claim 15, further comprising:

means for identifying a second setting of a second participant in the communication system in a second participant profile data structure corresponding to the second participant, the second participant using a third device in the communication session;

means for selecting a second data structure based upon the second setting, the second data structure comprising a description of a second media event, and an associated second curing action to take in response to detection of the second media event, the second media event comprising an audio element without subtitles;

wherein the means for scanning the media of the communication session during the communication session comprises means for scanning for both the first media event and the second media event;

means for identifying the second media event in the media of the communication session; and responsive to identifying the second media event:

means for executing the second associated curing action by automatically creating subtitles.

20. The device of claim 15, further comprising:

means for providing a reminder to a second participant of the communication session during the communication session of the first setting.

\* \* \* \* \*